J. TURNER & A. BUXTON.
METHOD OF MANUFACTURING LAWN TENNIS AND LIKE BALLS.
APPLICATION FILED MAY 23, 1910.

1,017,482.

Patented Feb. 13, 1912.

WITNESSES.

INVENTORS.

UNITED STATES PATENT OFFICE.

JOHN TURNER AND ANTHONY BUXTON, OF UXBRIDGE, ENGLAND, ASSIGNORS TO THE RUBBER PATENTS LIMITED, OF COWLEY, ENGLAND, A CORPORATION OF GREAT BRITAIN.

METHOD OF MANUFACTURING LAWN-TENNIS AND LIKE BALLS.

1,017,482. Specification of Letters Patent. Patented Feb. 13, 1912.

Application filed May 23, 1910. Serial No. 562,904.

*To all whom it may concern:*

Be it known that we, JOHN TURNER and ANTHONY BUXTON, both subjects of His Majesty the King of Great Britain, residing at Uxbridge, Middlesex, England, have invented a certain new and useful Improved Method of Manufacturing Lawn-Tennis and Like Balls, of which the following is a specification.

This invention relates to an improved method of manufacturing lawn tennis and like balls, the object being to produce a ball which has an even wall without seams or heavy protuberances or masses inside of same which act to prevent an even bounce or to destroy its balance in flight or play, and which has better air holding qualities than the usual ball.

Figure 1:
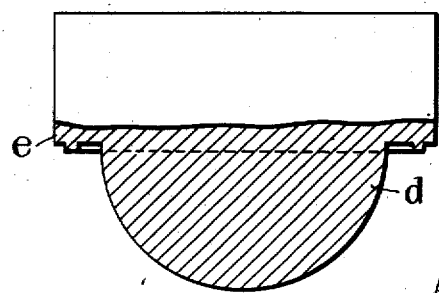
Figure 6:
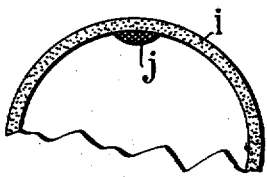
Figure 2:
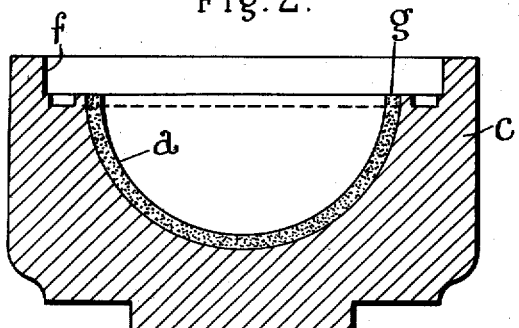
Figure 5:
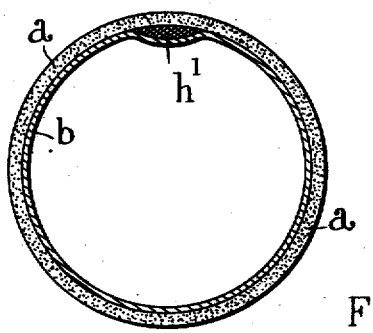
Figure 4:
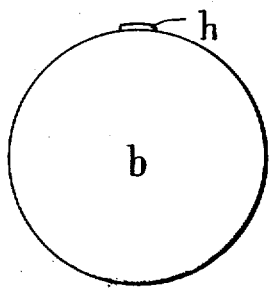
Figure 3:
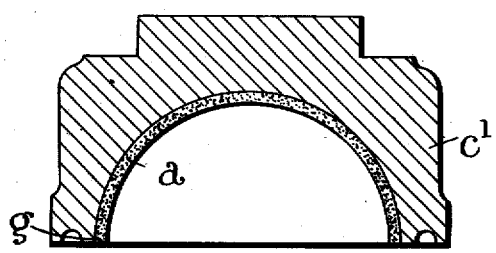

The invention will be described in connection with the accompanying drawings which show typical examples of certain parts hereinafter referred to and views of a ball and its parts in different stages, Figure 1 being a sectional elevation of a plunger, Fig. 2 a similar view of a lower mold, Fig. 3 a similar view of an upper mold. Fig. 4 is a view of an internal supporting ball or bladder, and Fig. 5 a section of one form of completed ball. Fig. 6 is a section of a part of a modified form of ball.

According to the invention shown in Figs. 1 to 5, the main portion of the ball is formed of two died out half spheres $a$; or several died out segments or parts of cured or vulcanized rubber or rubber compound, the quality of which varies according to the class of ball to be made, and which are connected together by a gutta percha or gutta percha compound solution or other suitable adhesive under heat and external pressure, the interior of the seam being preferably supported by pressure also which may be done by a thin rubber ball or bladder $b$ holding air under pressure.

In forming a ball such as described a half or suitable mold $c$ is employed in which is placed uncured rubber or a compound of rubber in a plastic state. Into the mold is forced a die plunger or chill $d$ corresponding in shape and carrying a shoulder or part $e$ adapted to seat in a recess $f$ of the mold $c$, or being so related thereto that a suitable space is left between the internal face of the mold and the external face of the plunger of the thickness of wall required for the ball a half sphere of which is shown at $a$ Fig. 2 in the mold as having been just formed. The half sphere $a$ or segment so formed is then cured or semicured by heat applied externally of the mold and plunger while still held between said mold and plunger so that shrinkage is avoided. When removed the edges $g$ of two half spheres or the edges of the various segments are treated with a solution of gutta percha or gutta percha compound or other suitable adhesive which will not cure with the fumes of the sulfur or heat and will hold the edges firmly. If no inner ball or bladder is to be used the two half spheres or segments are then transferred to molds somewhat smaller than those they have been made in, so that increased pressure is exerted on them to secure them together, the process being the same as that where a bladder is employed as hereinafter described, except that in place of the support of the inner bladder the usual carbonate of ammonia, or the like may be used to hold up by its gas the walls until the ball is blown by the needle. It will be seen that a ball formed from such parts or segments will have a wall of even thickness throughout and if a bladder is employed as hereinafter described may be without the usual inflating and closing plug usually secured to the inside of the wall.

The inner ball or bladder (which is employed in the construction shown in Fig. 5) $b$ is a thin rubber one and may be made in any usual way. It carries a plug $h$ for inflating and closing which projects outside of same. Such plug is of gutta percha or gutta percha compound as that is not affected by the sulfur fumes of the cured parts or is of some suitable material which will not cure and will close any hole made in it tightly as the instrument is withdrawn under heat and pressure. The inner ball or bladder is then blown (by the usual air needle piercing the plug) up to about the dimensions of the inside of the half spheres or segments, for which purpose the plug $h$ is heated and when the needle is withdrawn is compressed and the ball or bladder is placed inside one half sphere $a$, the other half $a$ which corresponds internally with the first half $a$ being then fitted over it. The plug $h$ when the inner ball or bladder is placed between the half spheres or the segments, comes between the inner ball or bladder and such half spheres or segments and is pressed against the inside of one of the latter. The slight pressure developed by the closing of the two halves causes the solutioned edges $g$ to adhere sufficiently firmly for the ball to be placed in molds somewhat smaller than those it has been made in but of the same character if desired so that a considerable pressure is exerted on it and in these molds it is heated up to about vulcanizing heat though for such a short period that the curing of the parts is not repeated if the ball is already cured or if it is semi-cured it is heated until fully so, the duration of heating being only sufficient to soften the gutta percha solution and cause it to adhere firmly. During this heating the outer pressure of the molds is counteracted by the expansion by heat of the inner ball, the outer wall being thus supported all over the seam or seams as well as over its general surface both inside and outside of same. Thus it will be seen that the ball or bladder $b$ acts for supporting the wall and joints or seams and not for getting the shape as that is obtained in the first instance by the plunger. The ball is now removed from the molds and pierced by passing an air needle through the outer casing $a$ and plug $h$ of the inner ball or bladder $b$ and is inflated to the pressure and dimensions desired. The plug $h$ is warmed through the outer cover in some suitable way before piercing as by holding the face of the ball to a source of heat and is afterward pressed from the outside when the needle is removed. The result of the heating and compression is that the plug $b$ is softened and spread as represented at $h'$ Fig. 5, so that it forms only a comparatively slight thickening of the wall of the ball at this point although it is sufficiently retained to act as a closure for the air needle opening when withdrawn, while it further acts to close the puncture formed by the needle in the outer casing by slightly protruding when warm into the opening left by such needle and setting hard therein.

Where it is not desired to employ the internal support or pressure the internal ball or bladder may be omitted as shown in Fig. 6, and in this case a plug of gutta percha or like material $j$ which will not cure as described, is attached to the inside of the walls $i$ of the ball to provide a closure for the needle.

In the claims it is to be understood that the expression rubber includes any suitable rubber compound.

What we claim is:—

1. The method of manufacturing lawn tennis or like balls which consists in dying out parts of same from uncured rubber in a plastic state, then curing same while still held between the members of the die, and then cementing the cured parts together by an adhesive which will not cure by the fumes from the cured parts.

2. The method of manufacturing lawn tennis or like balls which consists in dying out parts of same from uncured rubber in a plastic state, then curing same while still held between the members of the die, and then cementing the cured parts together by an adhesive which will not cure by the fumes from the cured parts and under heat and pressure.

3. The method of manufacturing lawn tennis or like balls which consists in dying out parts of same from uncured rubber in a plastic state, then curing same while still held between the members of the die, then cementing the cured parts together by an adhesive which will not cure by the fumes from the cured parts and under heat and pressure and then transferring the ball to the members of a mold capable of exerting increased pressure and heating such mold members for a short period.

4. The method of manufacturing lawn tennis and like balls which consists in dying out parts of same from uncured rubber then curing same while still held between the members of the die, then applying to the edges of the cured parts an adhesive which will not cure by the fumes from the cured parts, then inserting inside the parts an internal bladder and then transferring the ball to the members of a mold capable of exerting increased pressure and heating such mold members for a short period.

5. The method of manufacturing lawn tennis and like balls which consists in dying out parts of same from uncured rubber then curing same while still held between the members of the die, then applying to the edges of the cured parts an adhesive which will not cure by the fumes from the cured parts, then inserting inside the parts an internal bladder carrying a plug of material which will not cure and any opening made in which will readily close and then transferring the ball to the members of a mold capable of exerting increased pressure and heating such mold members for a short period.

In testimony whereof we have hereunto set our hands in the presence of two subscribing witnesses.

JOHN TURNER.
ANTHONY BUXTON.

Witnesses:
HERBERT C. BROOMFIELD,
FRANCIS W. KING.